3,190,876
ETHYLENICALLY UNSATURATED AZOBENZENE
DERIVATIVES
Martin M. Skoultchi, New York, N.Y., Albert I. Goldberg, Berkeley Heights, N.J., and Joseph Fertig, New York, N.Y., assignors to National Starch and Chemical Corporation, New York, N.Y., a corporation of Delaware
No Drawing. Filed Apr. 19, 1962, Ser. No. 188,860
6 Claims. (Cl. 260—197)

This invention relates to the preparation of novel ethylenically unsaturated derivatives of azobenzene.

It is the object of this invention to produce a novel class of ethylenically unsaturated azobenzene derivatives which are capable of undergoing vinyl type polymerization reactions either alone or in the presence of other vinyl type comonomers. A further object of this invention involves the preparation of polymerizable azobenzene derivatives which can be incorporated into a wide variety of polymers and copolymers so as to provide such polymers with a permanent, integral color as well as with improved light stability.

As is well known in the art, a vast number of the derivatives of azobenzene, i.e. derivatives of

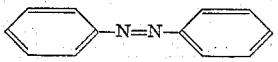

are employed as dyes and coloring agents. These compounds, which are collectively referred to as azo dyes, have had extensive application, particularly in the textile industry, wherein they have long been successfully used for the dyeing of naturally derived fibers and fabrics, such as those made from wool, cotton, silk and linen, as well as of artificial cellulosic fibers and fabrics, such as those made from rayon and various cellulose esters. However, with the advent and ever increasing popularity of the purely synthetic fibers, such as those derived, for example, from polyacrylic, polyester, polyvinyl chloride, polyvinylidene chloride, and polyolefin resins, it was found that many azo dyes, as well as many other existing dyes and dyeing techniques, were no longer operable with these new synthetic resin based fibers. As a result, it became necessary to devise new dyes and dyeing techniques for these materials. Moreover, dyes, in general, cannot be used for the permanent coloring of the films, sheets, and molded products which are made from such synthetic resins since such conversion products can be colored only by the inclusion therein of extraneous pigments.

The novel compositions of our invention are the ethylenically unsaturated azobenzene derivatives corresponding to the formula:

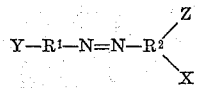

wherein $R^1$ and $R^2$ are radicals of the benzene series selected from among the group consisting of phenyl and naphthyl radicals, and wherein X is an ethylenically unsaturated group selected from the class consisting of acryloxy and methacryloxy groups and Y and Z represent at least one member of the group consisting of hydrogen, alkyl, aryl, acyloxy, aralkyl, alkoxy, hydroxy, or halogen radicals.

The following list is representative of the azobenzene derivatives of our invention. For purposes of brevity, this list notes only the acryloxy derivatives; however, it is, of course, to be understood that the corresponding methacryloxy derivatives may also be prepared. One may thus list: 4-(4-methylphenylazo)phenyl acrylate; 4-(3-methylphenylazo)phenyl acrylate; 4-(2-methylphenylazo)phenyl acrylate; 4-phenylazo-3-methyl phenyl acrylate; 2-phenylazo-4-methylphenyl acrylate; 4-phenylazophenyl acrylate; 4-(4-chlorophenylazo)phenyl acrylate; 3-hydroxy-4-(4-methylphenylazo)phenyl acrylate; 1-(2-methoxyphenylazo)-2-naphthyl acrylate; 4-(phenylazo)-2-phenylphenyl acrylate; and, 3,3'-dimethoxy-4-(1-hydroxy - 2 - naphthylazo)-4'-(1-acryloxy-4 - naphthylazo) biphenyl.

Thus, the novel azobenzene derivatives of our invention, as listed above, are seen to correspond to the following formula:

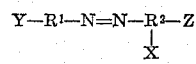

wherein $R^1$ is a phenyl radical, wherein $R^2$ is a radical of the benzene series selected from the group consisting of phenyl and naphthyl radicals, and wherein X is an ethylenically unsaturated group selected from the class consisting of acryloxy and methacryloxy groups and Y and Z represent hydrogen.

Thus, it is to be seen that the derivatives of our invention may be referred to as the acryloxy and methacryloxy derivatives of azobenzene. Each of the above listed derivatives, along with any others which may be prepared by the practitioner, may, in turn, contain a variety of other substituent groups including alkyl, aryl, acyloxy, aralkyl, alkoxy, hydroxy, and halogen groups wherein any one, or more of these substituent groups may be substituted on any available position on either one or both of the phenyl rings in the azobenzene nucleus. Moreover, it is this ability to prepare our novel derivatives so that they may contain one or more of these various substituent groups on any position in the azobenzene nucleus, which permits our derivatives to possess any desired shading of primary color.

All of the above listed compounds, as well as any others which may correspond to the above described formula, are materials which are capable of readily undergoing vinyl type polymerization. They are thus useful for the preparation of homopolymers and, more particularly, for the preparation of copolymers with a wide variety of other vinyl type, i.e. ethylenically unsaturated, monomers. Such copolymers have a "built in" color and also possess superior light stability. Both of the latter properties are imparted to these copolymers as a result of the presence therein of the azobenzene moiety which is permanently bound into and inherently part of the resulting copolymer molecule as a result of the incorporation therein of the ethylenically unsaturated azobenzene derivatives of our invention. The use, in this manner, of these derivatives is thus seen to overcome the inadequacies of azo and other heretofore utilized dyes with respect to their unsuccessful use in the dyeing of fibers and fabrics, as well as for the coloring of films, sheets, and moldings, derived from any of the synthetic resins which are prepared, either in whole or in part, from one or more ethylenically unsaturated monomers.

In brief, the synthesis of our novel derivatives is accomplished by the reaction of any acrylyl or methacrylyl halide, particularly the chloride, with the alkali metal salt of a hydroxy azobenzene or substituted hydroxy azobenzene, intermediate, thereby yielding the corresponding acryloxy or methacryloxy azobenzene derivative. Hereinafter it is to be understood that the use, for purposes of brevity, of the expression "the hydroxy azobenzene intermediate" is meant to include any hydroxy azobenzene as well as any substituted hydroxy azobenzene intermediate applicable for use in the process of our invention.

This reaction is ordinarily conducted by first dissolving the hydroxy azobenzene intermediate in a solution comprising an alkali metal alcoholate; the latter solvent being prepared by the addition of the selected alkali metal, which by virtue of its lower cost is usually sodium, to a large stoichiometric excess of an anhydrous aliphatic alcohol such as methanol or any other higher aliphatic alcohol which may be selected by the practitioner. This alkali metal alcoholate may, if desired, have been previously prepared or it may be prepared in situ. In any event, the end product of this reaction between the hydroxy azobenzoate intermediate and the alcoholate is an alkali metal salt of the hydroxy azobenzene intermediate. To the latter there is then added, with agitation, a slight stoichiometric excess, usually in the order of about 10%, of the selected acrylyl or methacrylyl halide. In those cases wherein the ultimate ethylenically unsaturated azobenzene derivative is known to undergo spontaneous homopolymerization, there may also be added to the reaction mixture from about 0.001 to about 0.1%, as based upon the initial weight of the hydroxy azobenzene intermediate, of a polymerization inhibitor such as benzoquinone or hydroquinone or its monomethyl ether. Upon the admixture of the two reactants, there is an instantaneous exothermic reaction. This reaction soon attains a peak exotherm, which should preferably, be kept below 70° C. so as to minimize the possibility of any undesired side reactions or of any subsequent polymerization of the resulting azobenzene derivative. Following the attainment of this peak exotherm, agitation should be continued until the temperature of the reaction mass has decreased to ambient conditions.

At this point in the procedure, the reaction vessel, and the contents therein, are cooled to a temperature of at least 0° C., or lower, by means of an ice bath or any other cooling media, such as a salt-ice mixture, whose use may be selected by the practitioner. Under these conditions, the solid product, comprising the acryloxy or methacryloxy azobenzene derivative and an alkali metal halide by-product, will separate out from the reaction mass and may then be filtered and washed with a cold solvent, such as methanol, in which the derivative is only sparingly soluble. The washed derivative may then be air dried and its purification completed by means of a recrystallization procedure from a hot solution of a solvent, such as methanol, in which the derivative is sparingly soluble but wherein the by-product residue of alkali metal halide will be completely insoluble.

By means of the process of this invention, the yield of our ethylenically unsaturated azobenzene derivatives will ordinarily be in the range of about 40 to 70%, by weight, of the theoretical. In general, however, it is to be noted that the yield of our derivatives will be increased in direct proportion to the temperature to which their reaction masses are cooled following the initial exothermic reaction. Such additional cooling may be achieved, for example, by utilizing an acetone-solid carbon dioxide cooling bath in place of an ordinary ice or ice-salt mixture. Analysis of our novel derivatives, by means of saponification equivalent techniques, indicates a purity in the range of about 98%, by weight, or higher.

The intermediates for the above described process, i.e. the various applicable hydroxy azobenzene compounds, are commercially available materials which are prepared by means of reactions well known to those skilled in the art. These reactions involve the coupling, in an alkaline solution, of a phenyldiazonium halide, or a substituted phenyldiazonium halide; together with a selected phenol or substituted phenol. Thus, by starting with such substituted phenols or substituted phenyldiazonium salts, it is of course possible to prepare the ultimate acryloxy or methacryloxy azobenzene derivatives with a variety of alkyl, aryl, acyloxy, aralkyl, alkoxy, hydroxy, or halogen radical substituents wherein said substituent radicals may be on either one or both of the phenyl rings of the azobenzene nucleus. By varying the structure of the intermediate in this manner, it is possible, as noted earlier, to prepare our ethylenically unsaturated azobenzene derivatives so that they may inherently possess any shading of primary color which may be selected by the practitioner. This, in turn, permits the copolymers which can be prepared with the use of our derivatives as comonomers to be made in any desired permanent color without the need for blending with extraneous pigments. It is to be noted, at this point, that neither the initial preparation of the hydroxy azobenzene intermediates nor their subsequent conversion to alkali metal salts constitutes a novel aspect of the process of our invention.

The following examples will further illustrate the embodiment of this invention. In these examples, all parts given are by weight unless otherwise noted.

*Example I*

This example illustrates the preparation of 4-(4-methylphenylazo)phenyl acrylate, i.e.

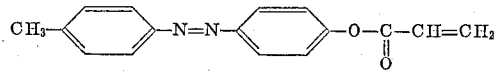

by means of the process of our invention.

A solution of sodium methoxide was first prepared by dissolving 6 parts of sodium metal in 250 parts of anhydrous methanol. The latter solution was cooled to room temperature whereupon 53 parts of 4-(4-methylphenylazo)phenol immediately followed by 24.9 parts of acrylyl chloride were added, with agitation, thereby initiating an instantaneous exothermic reaction which achieved a peak exotherm of 42° C. Agitation was then continued for about 30 minutes until the temperature of the reaction mass fell to 30° C. and at that point it was cooled, in an ice bath, to 0° C.

The solid product which separated out upon the icing of the reaction mass was then filtered and washed with small portions of cold methanol. After being air dried, it was recrystallized from hot methanol so as to yield 40 parts, or about 60% of the theoretical yield, of solid 4-(4-methylphenylazo)phenyl acrylate which, by saponification equivalent, indicated a purity of better than 99%, by weight. This product, although tan in color, yielded yellow solutions when dissolved in organic solvents such as acetone.

*Example II*

This example illustrates the preparation of 4-(4-methylphenylazo)phenyl methacrylate, i.e.

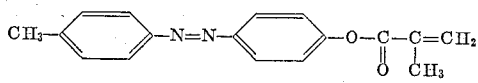

by means of the process of our invention.

In preparing this product, we employed the identical procedure as was utilized for the preparation of the derivative of Example I with the exception that 28.8 parts of methacrylyl chloride were, in this case, used in place of the 24.9 parts of acrylyl chloride of Example I. This procedure produced 40.5 parts, or about 58% of the theoretical yield, of solid 4-(4-methylphenylazo)phenyl methacrylate which, by saponification equivalent, indicated a purity of 98%, by weight. This product, although tan in color, yielded yellow solutions when dissolved in organic solvents such as acetone.

*Example III*

The following table presents the pertinent data relating to 20 additional ethylenically unsaturated azobenzene derivatives. In this table, derivatives Nos. 1, 3, 5, 7, 9, 11, 13, 15, 17, and 19, i.e. the odd numbered derivatives, are acryloxy azobenzene derivatives which were prepared by means of the procedure of Example I. Derivatives Nos. 2, 4, 6, 8, 10, 12, 14, 16, 18, and 20, i.e. the even numbered derivatives, are methacryloxy azobenzene derivatives which were prepared by means of the procedure of Example II. In the structural formulas which are given for each of these derivatives, the abbreviations "Acr" and "MeAcr" are used, respectively, to designate acryloxy and methacryloxy groups.

| No. | Name | Structure | Parts azo-benzene intermediate* | Yield (percent by wt.) | Yield (pts. by wt.) | Color of organic solvent solution |
|---|---|---|---|---|---|---|
| 1 | 4-(3-methylphenylazo)phenyl acrylate. | 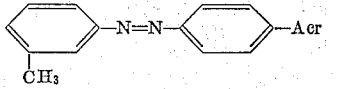 | 53 | 60 | 40.0 | Yellow. |
| 2 | 4-(3-methylphenylazo)phenyl methacrylate. | 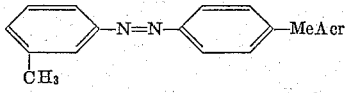 | 53 | 62 | 43.5 | Do. |
| 3 | 4-(2-methylphenylazo)phenyl acrylate. | 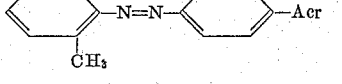 | 53 | 58 | 38.5 | Do. |
| 4 | 4-(2-methylphenylazo)phenyl methacrylate. | 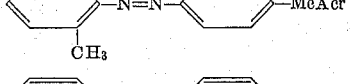 | 53 | 62 | 43.5 | Do. |
| 5 | 4-phenylazo-3-methylphenyl acrylate. | 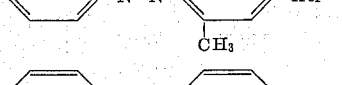 | 53 | 50 | 33.2 | Do. |
| 6 | 4-phenylazo-3-methylphenyl methacrylate. | 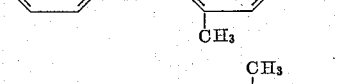 | 53 | 55 | 38.5 | Do. |
| 7 | 2-phenylazo-4-methylphenyl acrylate. | 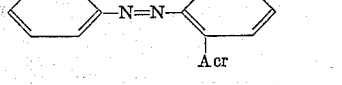 | 53 | 40 | 26.6 | Do. |
| 8 | 2-phenylazo-4-methylphenyl methacrylate. | 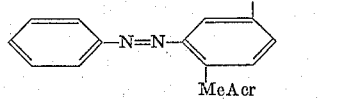 | 53 | 40 | 28.0 | Do. |
| 9 | 4-phenylazophenyl acrylate | 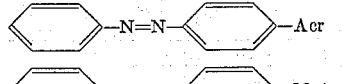 | 49.5 | 65 | 41.0 | Do. |
| 10 | 4-phenylazophenyl methacrylate. | 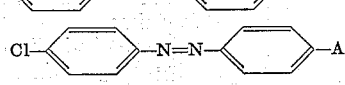 | 49.5 | 72 | 48.0 | Do. |
| 11 | 4-(4-chlorophenylazo)phenyl acrylate. | 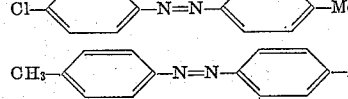 | 58.4 | 75 | 54.0 | Do. |
| 12 | 4-(4-chlorophenylazo)phenyl methacrylate. | 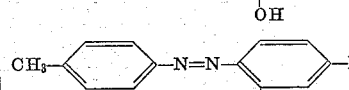 | 58.4 | 78 | 58.8 | Do. |
| 13 | 3-hydroxy-4-(4-methylphenylazo)phenyl acrylate. | 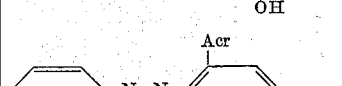 | 57.0 | 32 | 22.5 | Orange. |
| 14 | 3-hydroxy-4-(4-methylphenylazo)phenyl methacrylate. | 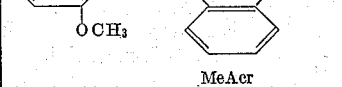 | 57.0 | 65 | 45.7 | Do. |
| 15 | 1-(2-methoxyphenylazo)-2-naphthyl acrylate. | 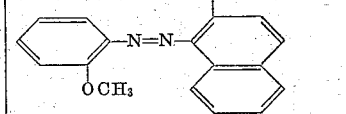 | 69.5 | 40 | 33.2 | Red. |
| 16 | 1-(2-methoxyphenylazo)-2-naphthyl methacrylate. |  | 69.5 | 21 | 18.1 | Do. |

See footnote at end of table.

| No. | Name | Structure | Parts azo-benzene intermedi-ate* | Yield (percent by wt.) | Yield (pts. by wt.) | Color of organic solvent solution |
|---|---|---|---|---|---|---|
| 17 | 4-(phenylazo)-2-phenylphenyl acrylate. | ⌬—N=N—⌬—Acr (with phenyl substituent) | 68.5 | 38 | 31.1 | Orange. |
| 18 | 4-(phenylazo)-2-phenylphenyl methacrylate. | ⌬—N=N—⌬—MeAcr (with phenyl substituent) | 68.5 | 48 | 41.0 | Do. |
| 19 | 3,3'-dimethoxy-4-(1-hydroxy-2-naphthylazo)-4'-(1-acryloxy-4-naphthylazo)biphenyl. | Acr—naphthyl—N=N—⌬(OCH₃)—⌬(OCH₃)—naphthyl(OH)—N=N— | 138.3 | 68 | 103.0 | Blue. |
| 20 | 3,3'-dimethoxy-4-(1-hydroxy-2-naphthylazo)-4'-(1-methacryloxy-4-naphthylazo) biphenyl. | MeAcr—naphthyl—N=N—⌬(OCH₃)—⌬(OCH₃)—naphthyl(OH)—N=N— | 138.3 | 50 | 77.7 | Do. |

*The intermediates used in preparing each of the above described derivatives are listed below.

Derivative
No.:        Intermediate
1 _____ 4-(3-methylphenylazo)phenol.
2 _____ Do.
3 _____ 4-(2-methylphenylazo)phenol.
4 _____ Do.
5 _____ 4-phenylazo-3-methylphenol.
6 _____ Do.
7 _____ 2-phenylazo-4-methylphenol.
8 _____ Do.
9 _____ 4-phenylazophenol.
10 _____ Do.
11 _____ 4-(4-chlorophenylazo)phenol.
12 _____ Do.
13 _____ 3-hydroxy-4-(4-methylphenylazo)phenol.
14 _____ Do.
15 _____ 1-(2-methoxyphenylazo)-2-napthol.
16 _____ Do.
17 _____ 4-(phenylazo)-2-phenylphenol.
18 _____ Do.
19 _____ 3,3'-dimethoxy-4-(1-hydroxy-2-naphthylazo)-4'-(1-hydroxy-4-naphthylazo)biphenyl.
20 _____ Do.

Summarizing, our invention is thus seen to provide a novel class of ethylenically unsaturated derivatives of azobenzene. Variations may be made in proportions, procedures and materials without departing from the scope of this invention as defined by the following claims.

We claim:

1. An ethylenically unsaturated azobenzene derivative corresponding to the formula:

$$Y-R^1-N=N-R^2-Z$$
$$\phantom{Y-R^1-N=N-R^2-}|$$
$$\phantom{Y-R^1-N=N-R^2-}X$$

wherein $R^1$ is a phenyl radical, wherein $R^2$ is a radical of the benzene series selected from the group consisting of phenyl and naphthyl radicals, and wherein X is an ethylenically unsaturated group selected from the class consisting of acryloxy and methacryloxy groups and Y is a substituent radical selected from the class consisting of the hydrogen, chloro, methoxy, and alpha-naphthol azo ortho-methoxy phenyl radicals; wherein Z, when $R^2$ is a phenyl radical, is a substituent radical selected from the class consisting of the hydrogen, methyl, hydroxy and phenyl radicals; and wherein Z, when $R^2$ is a naphthyl radical, is hydrogen.

2. 4-(4-methylphenylazo)phenyl acrylate.
3. 4-phenylazo-3-methylphenyl acrylate.
4. 4-phenylazophenyl acrylate.
5. 4-(4-chlorophenylazo)phenyl acrylate.
6. 1-(2-methoxyphenylazo)-2-naphthyl acrylate.

No references cited.

CHARLES B. PARKER, *Primary Examiner.*